(12) United States Patent
Lee et al.

(10) Patent No.: US 8,842,537 B2
(45) Date of Patent: Sep. 23, 2014

(54) CONFIGURING TRAFFIC ALLOCATIONS IN A ROUTER

(75) Inventors: Leo S. Lee, Downers Grove, IL (US);
Timothy E. Blair, Griffith, IN (US);
David H. Liu, Herndon, VA (US)

(73) Assignee: Tellabs Operations, Inc., Naperville, IL (US)

( * ) Notice: Subject to any disclaimer, the term of this patent is extended or adjusted under 35 U.S.C. 154(b) by 179 days.

(21) Appl. No.: 13/216,513

(22) Filed: Aug. 24, 2011

(65) Prior Publication Data

US 2012/0051217 A1 Mar. 1, 2012

Related U.S. Application Data

(60) Provisional application No. 61/378,065, filed on Aug. 30, 2010.

(51) Int. Cl.
*H04L 12/58* (2006.01)
*H04L 12/26* (2006.01)
*H04L 12/725* (2013.01)
*H04L 12/701* (2013.01)

(52) U.S. Cl.
CPC .............. *H04L 43/028* (2013.01); *H04L 43/16* (2013.01); *H04L 43/0894* (2013.01); *H04L 45/302* (2013.01); *H04L 45/00* (2013.01)
USPC ............ 370/235; 370/230; 370/412; 370/389

(58) Field of Classification Search
CPC ......... H04L 47/10; H04L 47/32; H04L 47/12; H04L 47/2433; H04L 45/00; H04L 45/38; H04B 7/18586
USPC .............. 370/237, 431, 230.1, 352, 412, 252; 455/452.2, 450
See application file for complete search history.

(56) References Cited

U.S. PATENT DOCUMENTS

| | | | | |
|---|---|---|---|---|
| 5,638,359 | A * | 6/1997 | Peltola et al. | 370/229 |
| 5,970,048 | A * | 10/1999 | Pajuvirta et al. | 370/230 |
| 6,535,486 | B1 * | 3/2003 | Naudus et al. | 370/235 |
| 6,977,894 | B1 * | 12/2005 | Achilles et al. | 370/235 |
| 7,215,637 | B1 * | 5/2007 | Ferguson et al. | 370/230.1 |
| 7,362,702 | B2 * | 4/2008 | Terrell et al. | 370/230 |
| 7,570,584 | B1 * | 8/2009 | Daley | 370/229 |
| 7,742,497 | B2 * | 6/2010 | Ganti et al. | 370/448 |
| 2002/0080786 | A1 * | 6/2002 | Roberts | 370/389 |
| 2003/0035385 | A1 * | 2/2003 | Walsh et al. | 370/316 |
| 2011/0096666 | A1 * | 4/2011 | Davari | 370/235 |

* cited by examiner

*Primary Examiner* — Robert Wilson
*Assistant Examiner* — Sai Aung
(74) *Attorney, Agent, or Firm* — Hamilton, Brook, Smith & Reynolds, P.C.

(57) ABSTRACT

Disclosed herein are methods and calculators for configuring traffic allocations for service classes with different Quality of Service (QoS) in a router. Example embodiments involve setting allocations at a router based on traffic rate values and/or traffic weight values provided by a user. The router may monitor actual traffic rates to ensure that traffic is not being dropped due to improper rate allocations and to provide historical data for optimizing traffic allocations. In addition, the router may automatically adjust traffic allocations to avoid dropping high(er) priority traffic. The router may also transmit alarms to the user and/or to other network devices to prompt traffic re-routing and/or re-allocation of traffic rates. Example methods and apparatus ensure appropriate traffic allocation to meet certain QoS metrics.

24 Claims, 8 Drawing Sheets

| Traffic rate to weights | | | Weights to traffic rate | |
|---|---|---|---|---|
| Please fill in the YELLOW fields | | | | |
| % allocated to CBR | 40 | | % allocated to CBR | 40 |
| % for VBRrt Class 2 | 30 | | Weight for VBRrt Class 2 | 50 |
| % for VBRnrt Class 1 | 20 | | Weight for VBRnrt Class 1 | 33 |
| Remaining % for BE Class 0 | 10 | | Weight for BE Class 0 | 17 |
| | | | Interface Bandwidth (kbps) | 100,000 |
| Weights: | | | Traffic Rate (kbps): | |
| Class 2 | 50 | | Class 2 | 30000 |
| Class 1 | 33 | | Class 1 | 19800 |
| Class 0 | 17 | | Class 0 | 10200 |

CONFIGURING TRAFFIC ALLOCATIONS IN A ROUTER

RELATED APPLICATION

This application claims the benefit of U.S. Provisional Application No. 61/378,065, filed on Aug. 30, 2010. The entire teachings of the above application is incorporated herein by reference.

BACKGROUND OF THE INVENTION

Quality of Service (QoS) is a measure of telecommunications service quality provided by a carrier to a subscriber. In asynchronous transfer mode (ATM) networks, QoS may be defined on an end-to-end basis, e.g., in terms of how frequently packets are delivered intact and on time. Example ATM performance parameters used to calculate QoS include cell error ratio, cell loss ratio, cell transfer delay, and cell delay variability.

Carriers typically divide ATM network traffic into classes, each of which is guaranteed a minimum QoS. Subscribers usually pay for class allocations based on the type(s) of traffic they expect to send and receive via the network. For instance, subscribers who expect to send time-sensitive traffic, such as voice traffic, may choose to pay for a greater allocation of higher class service, i.e., service with a better guaranteed QoS. Unfortunately, it is often difficult to determine the traffic weight and traffic rate settings necessary for achieving the desired QoS. In the past, difficulties in determining the appropriate traffic weight and rate settings have led to lost revenue for service providers.

SUMMARY OF THE INVENTION

Embodiments of the present invention include methods and corresponding apparatus for configuring traffic allocations for a router. One example includes determining a traffic weight value for each of a plurality of traffic rate values, each of which is associated with a respective class of service. The example further includes setting traffic allocations for each class of service on the router based on the traffic weight values. Alternatively, examples may include determining a plurality of traffic weight values, then determining a traffic rate value for each traffic weight value. The traffic weight values and/or traffic rate values are then used to set traffic allocations for each class of service on the router.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1 is a diagram that shows a user interface for a weighted fair queuing (WFQ) calculator that can be used to determine traffic weight values from traffic rate values (and vice versa) for configuring traffic allocations in a router.

DETAILED DESCRIPTION OF THE INVENTION

Figure 2:
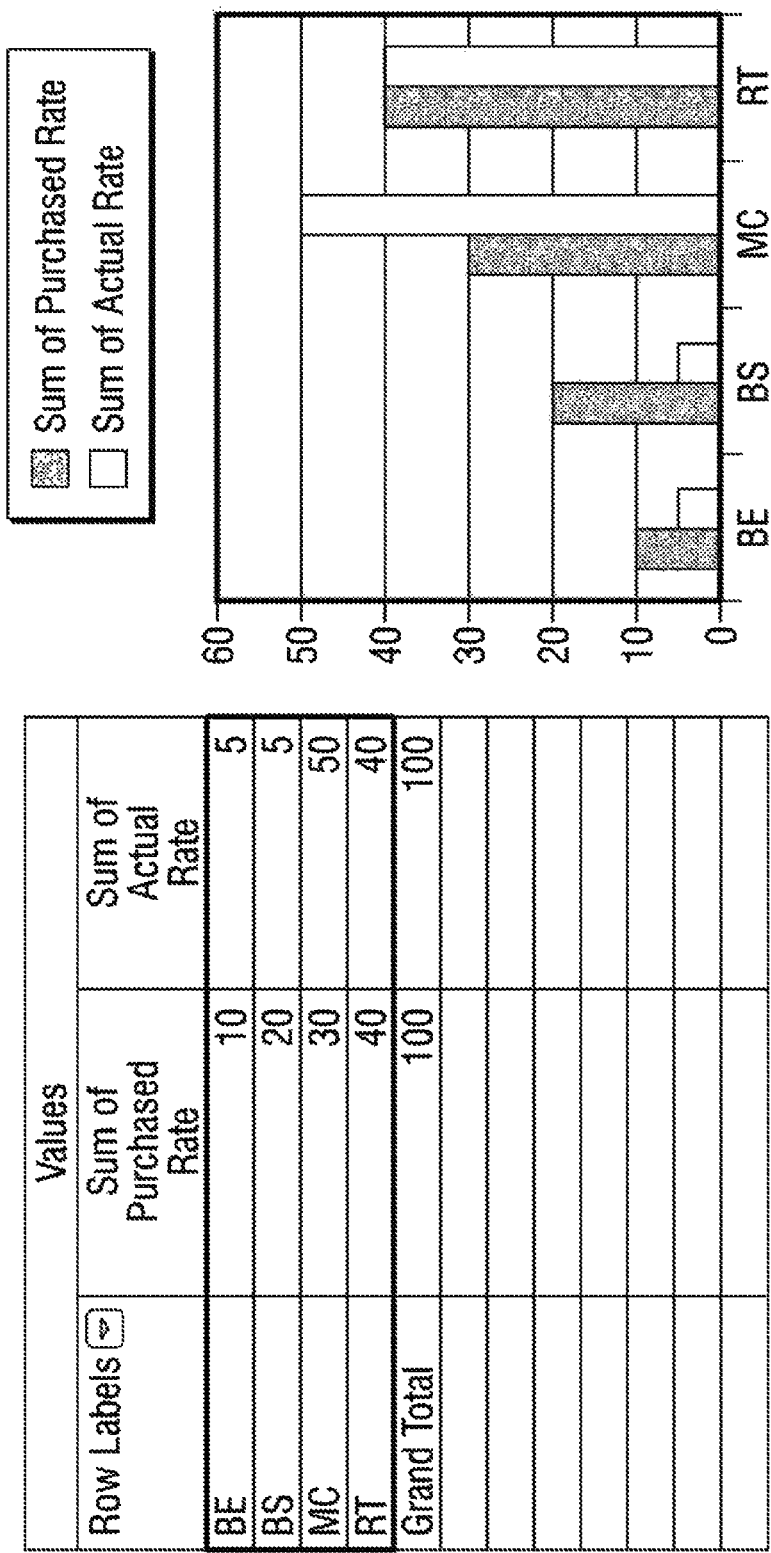
FIG. 2 is a diagram that shows trend analytics in pivot table (left) and pivot table graph (right) formats.

Currently, there is no defined or published documentation which explains how traffic weights are used or how to rate-limit broadcast/multicast traffic. This has led to some level of confusion and frustration for the end-users of network routers. In addition, it may be useful to leverage the abilities of most network routing platforms and enhance them to include mechanisms to generate additional revenue for end-users.

Embodiments of the present invention simplify advanced Quality of Service (QoS) configurations on network routers, such as a Tellabs® 8800 Multi-Service Router or other suitable router or routing component. Example embodiments also clarify the role of weighted fair queuing (WFQ) values on QoS and the impact of WFQ values on traffic flows. Example embodiments assist in proper provisioning of QoS in the network routers and reduce or eliminate a possibility of lost revenue due to an inadequate or improper traffic allocation configuration.

FIG. 1 shows a graphical user interface for a WFQ calculator that simplifies QoS and provides some general considerations for WFQ. The calculator, which may be implemented on a specialized or general-purpose processor, converts between the weights specified in each queue and the end result of bearer traffic that is actually being delivered (and vice versa). The calculator also teaches an average user how traffic rate values relate to traffic weight values.

In the example shown in FIG. 1, the calculator operates on the following traffic rate values: 40% for constant bit rate (CBR) traffic; 30% for Class 2 variable bit rate (VBR) traffic; 20% for Class 1 VBR traffic; and 10% for best-effort (BE) traffic. CBR traffic receives 40% of the available 100 kbps interface bandwidth, or 40 kbps. The other traffic shares the remaining 60 kbps of interface bandwidth in proportion to the traffic rate values entered in the calculator. The calculator uses the traffic rate values to determine the traffic weight values for the VBR and BE traffic according to the following example formula:

$$W_x = \frac{R_x}{100 - R_{CBR}},$$

where $W_x$ and $R_x$ are the traffic weight and rate values, respectively, for the class in question, and $R_{CBR}$ is the CBR traffic rate value. In this case, the traffic weight values are 50 for Class 2 VBR traffic, 33 for Class 1 VBR traffic, and 17 for BE traffic. Those skilled in the art will appreciate that traffic rate values can be calculated from traffic weight values in a similar fashion. The calculator determines target allocations from the traffic rates by multiplying the remaining 60 kbps of interface bandwidth with the traffic weight values, then dividing by 100. Next, the router is configured using the allocations.

Once the QoS configuration is complete, the router polices and shapes traffic to the specified criteria, e.g., the traffic allocations. Packets that exceed the limitations may be dropped or discarded. For some carriers, that functionality alone is sufficient. However, there is additional revenue that is being overlooked in this regard. For example, it may be useful to set-up thresholds on each queue so the carrier can apply analytics and generate reports that indicate what percentage of each queue is actually dropped. This notification can come in the form of an alarm notification that is generated by a management system.

Consider a QoS configuration where 40% is allocated to real-time voice, 30% to mission-critical data, 20% to business services, and 10% to best-effort Internet services, as in the example of FIG. 1. If the carrier analyzes the data and finds that the customer is actually sending close to 50% mission-critical traffic, then 20% of the mission-critical traffic may be discarded. The carrier can then alert the customer to this detail, allowing the customer to purchase more bandwidth from the carrier and/or to readjust the bandwidth profile to better fit customer needs. The carrier can provide this service as a "Network Traffic-Utilization Monitoring Service," thus opening a door to provide not only transport services but also Professional Engineering Services. Deep packet inspection (DPI) can also be developed on routers to view the layers 4-7 (of the ISO stack) of the IP data and provide more in-depth policy management so that customers can have a better understanding of the type of data that is transported on their network(s).

The capabilites that can be added via DPI include network trend analysis and automatic weight adjustment. Network trend analysis is based on the understanding of the percentage of the traffic flow for each traffic class transiting the router based on DPI and rate/weight determination described above. Performing additional data collection enables service providers to better understand the traffic flow for each service type. For example, the router may collect data indicating traffic trends for each service class as a function of time (e.g., on hourly, daily, weekly, and/or monthly schedules). The router can also further inspect the traffic to understand what traffic type (e.g., Internet, business services, real-time voice) is being transmitted and/or received within each service class. In addition, the router can look even deeper into individual traffic type to get more detailed information, such as internet web-addresses, IP addresses, area codes, etc. These analytics can be raw CSV data that can be exported to a spreadsheet program and then automated into a pivot table and pivot table graph, such as the table and graph shown in FIG. 2.

When traffic reaches a certain (e.g., pre-determined) threshold, the router can send an alarm to other devices on the network, such as a management system. The alarm may also be transmitted to the customer. The router can also automatically adjust traffic allocations to alleviate congestion. For example, in one embodiment, if the allocation for mission-critical data is set at 20% and the actual traffic rate for mission-critical data reaches 90% of its allocation (i.e., 18%) threshold for 30 minutes, the system automatically increases the allocation by 10% to a net percentage of 22% so that mission-critical data is not lost. The allocation for lower-priority traffic, such as BE traffic, is automatically scaled back to accommodate the increase in allocation for the higher-priority mission-critical traffic. When a system reaches a threshold, not only does it adjust its weight, it also sends control traffic to the upstream or downstream device so that the upstream of downstream device can make the same adjustment. In a point-to-multipoint network, it is also possible to designate which system makes the weight adjustments since the net aggregate of the multipoint devices need to equal 100% of the through-put of the single point device.

In addition, it is useful to limit broadcast/multicast traffic from generating a layer 2 storm which can impact virtual private local area network service/virtual private wire service (VPLS/VPWS) architecture. Embodiments of the present invention can be used to generate and apply multicast rules on dropping broadcast/multicast traffic. For instance, the code reproduced below prevents generate of layer 2 storm on an example router, such as a Tellabs® 8800, in the absence of a multicast rate-limiting command.

```
RATE-LIMITING BROADCAST TRAFFIC - the below example uses
a traffic-param named BROADCAST_STORM_RX that is applied as the
multicast rule in the qos-group. This enables this traffic-param to drop any
broadcast/multicast traffic above 10% of the group rate of 10 Mbps in
this example.
8830.28(cfg-br-inst[TestME])# show running-config qos traffic-param-
list name G_Option_2_Rx_TPL
# Running Config On: Wed Jun 9 21:04:02 2010
# Software Version : 8.0.1.1.206
exit all
enable config qos
  traffic-param-list name G_Option_2_Rx_TPL
    rule 1 traffic-param G_Option_Best_Effort_2_Rx
    rule 2 traffic-param G_Business_Option_2_Rx
    rule 3 traffic-param G_Mission_Critical_Option_2_Rx
    rule 4 traffic-param G_Real_Time_Option_2_Rx
    rule 5 traffic-param BROADCAST_STORM_RX
    exit
8830.28(cfg-br-inst[TestME])# show running-config qos traffic-param
name BROADCAST_STORM_RX
# Running Config On: < Time and Date>
# Software Version : A.B.C.D.E
exit all
enable config qos
  traffic-param name BROADCAST_STORM_RX
    service-class UBR-rrd
    traffic-rate
      fractional bandwidth 10
      exit
    weight 10
    exit
8830.28(config)# show running-config qos qos-group name
Gold_Option_2_100Mbps
# Running Config On: <Time and Date>
# Software Version : A.B.C.D.E
exit all
enable config qos
  qos-group name Gold_Option_2_100Mbps
    rx-qos
      traffic-param-list G_Option_2_Rx_TPL
      multicast-rule 5
      group rate 10000
      exit
    tx-qos
      traffic-param-list Gold_Option_2_Tx_TPL
      group rate 10000
      weight-profile class0 14 class1 29 class2 57
      profile class0 0 class1 100 class2 100 class3 100
      exit
    exit
```

Figure 3A:
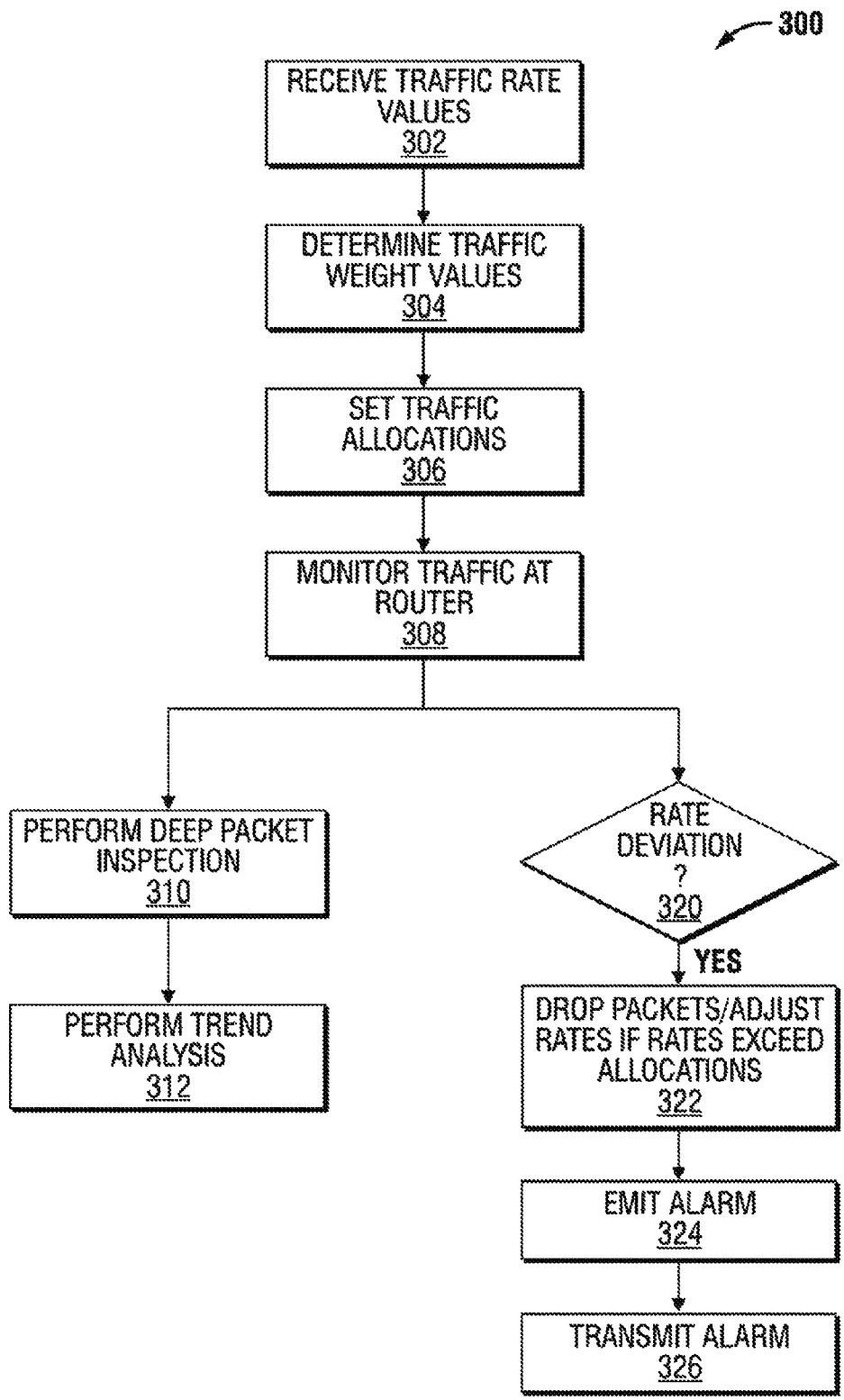
FIGS. 3A and 3B are flowcharts that illustrate example procedures configuring traffic allocations in a router.
Figure 3B:
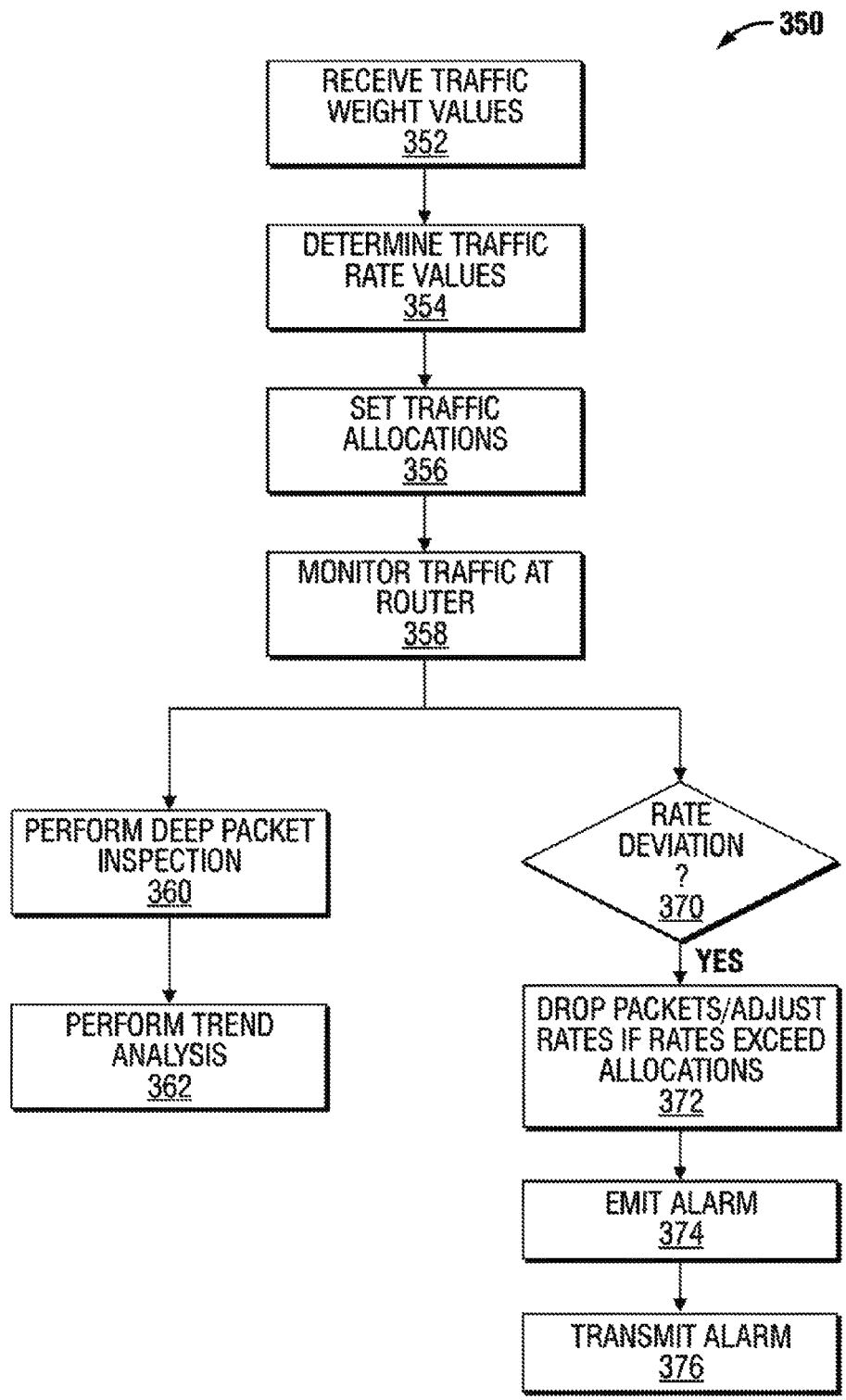

FIGS. 3A and 3B are flowcharts that illustrate how procedures 300 and 350, respectively, according to embodiments of the present invention configure, set, and apply traffic allocations for routing packets transiting a router in a network. In the procedure 300, traffic rate values are received (302) for each class of service and used to determine corresponding traffic weight values (304), as shown in FIG. 3A. Alternatively, the procedure 350 traffic weight values can be received (352) for each service class and used to determine corresponding traffic rate values (354), as shown in FIG. 3B. Next, traffic allocations are set (306, 356) for each class in response to the determination of traffic weight/rate values.

The router can optionally monitor traffic (308, 358), possibly by performing DPI (310, 360) and/or trend analysis (312, 362) as described above. If actual traffic rates deviate from allocations (320, 370), the router may drop packets from overflowing queues and/or automatically adjust the allocations to match the actual traffic rates (322, 372). In addition, the router may emit an alarm (324, 374) to the service provider and/or the customer. The router may also transmit the alarm (326, 376) to other devices connected to the network, e.g., in order to alter the composition of traffic flowing to or from the router.

Figure 4:
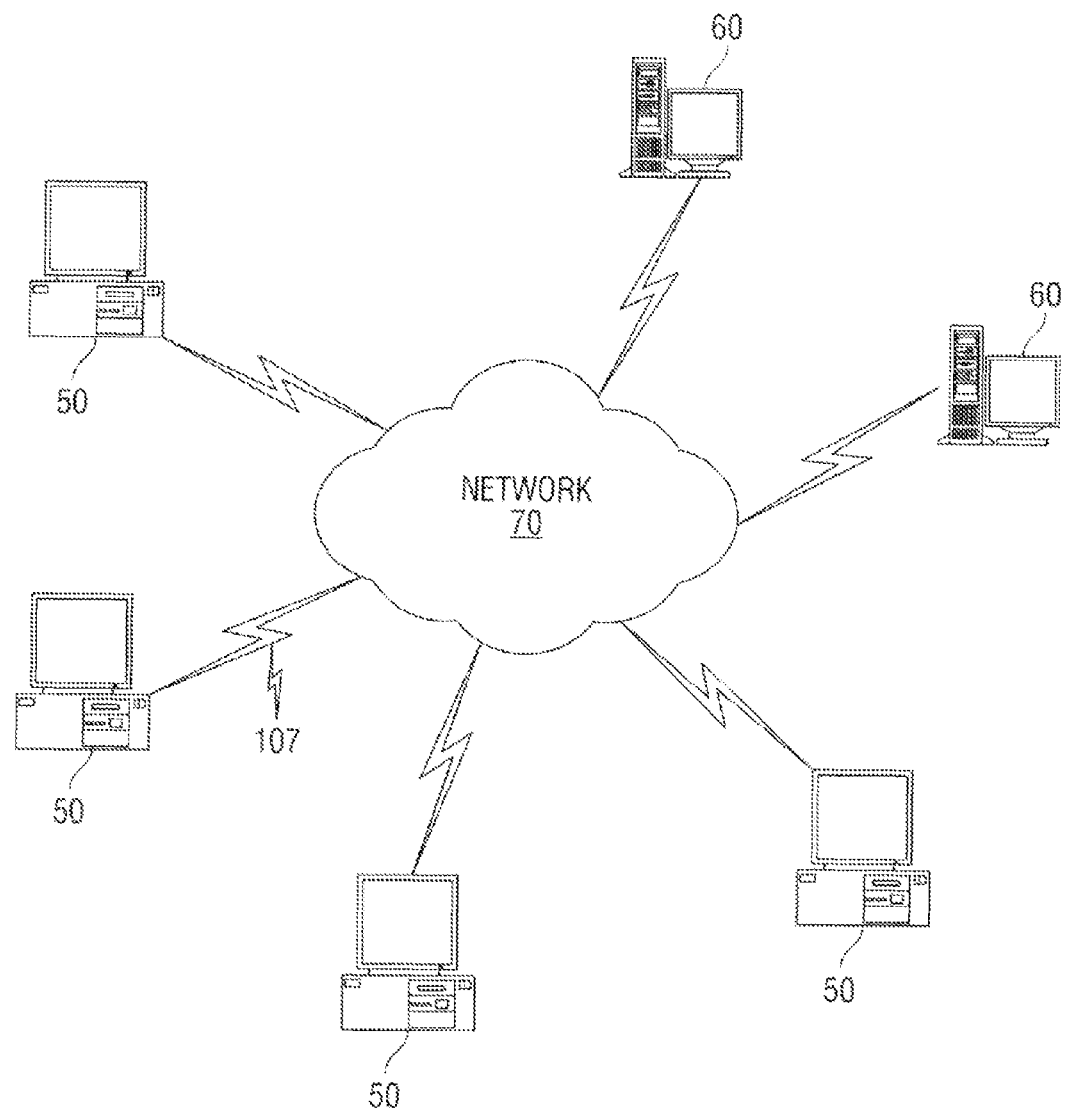
FIG. 4 is a diagram that shows a computer network or similar digital processing environment in which embodiments the present invention may be implemented.

FIG. 4 illustrates a computer network or similar digital processing environment in which embodiments of the present invention, such as the WFQ calculator of FIG. 1, may be implemented. Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 5:
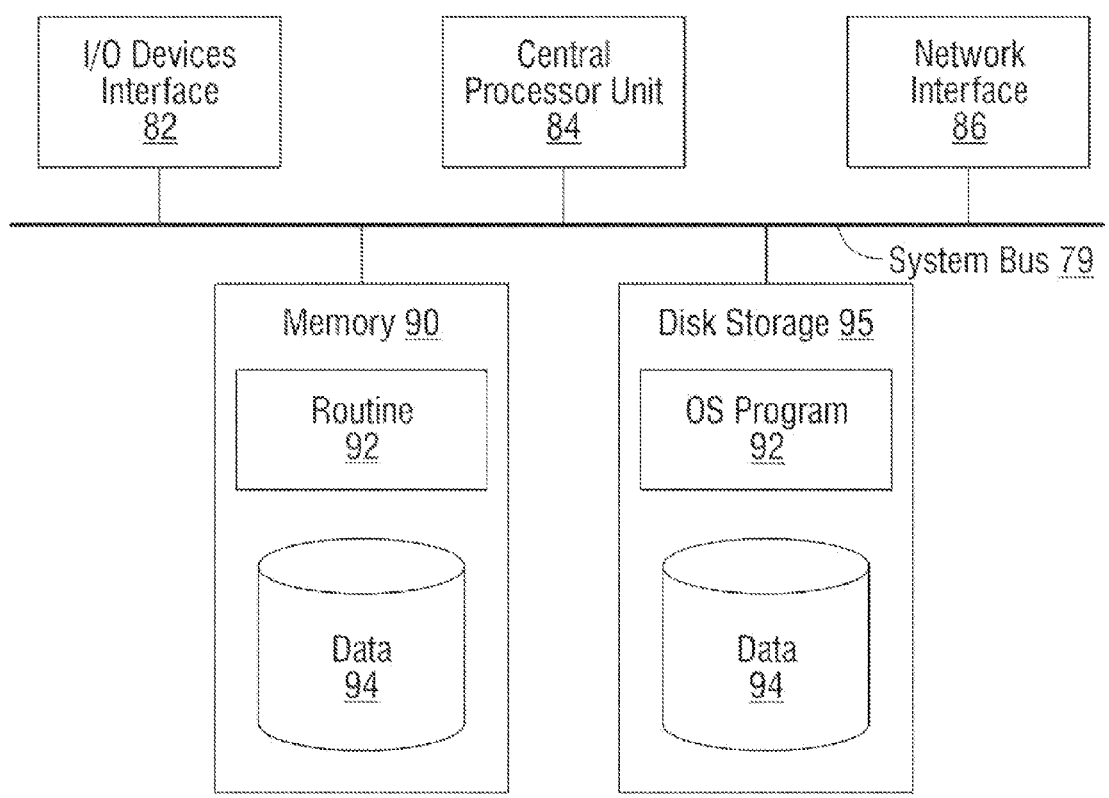
FIG. 5 is a diagram of the internal structure of a computer (e.g., client processor/device 50 or server computers 60) in the computer system of FIG. 4.

FIG. 5 is a diagram of the internal structure of a computer (e.g., client processor/device 50 or server computers 60) in the computer system of FIG. 4. Each computer 50, 60 contains a system bus 79, where a bus is a set of hardware lines used for data transfer among the components of a computer or processing system. The bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 4). Memory 90 provides volatile storage for computer software instructions 92 and data 94 used to implement an embodiment of the present invention (e.g., using the example code detailed above). Disk storage 95 provides non-volatile storage for computer software instructions 92 and data 94 used to implement an embodiment of the present invention. A central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternative embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like. Similarly, the term, "non-transitory" covers computer-readable media, such as optical or magnetic disks, on which computer software or code(s) can be physically embodied.

Figure 6:
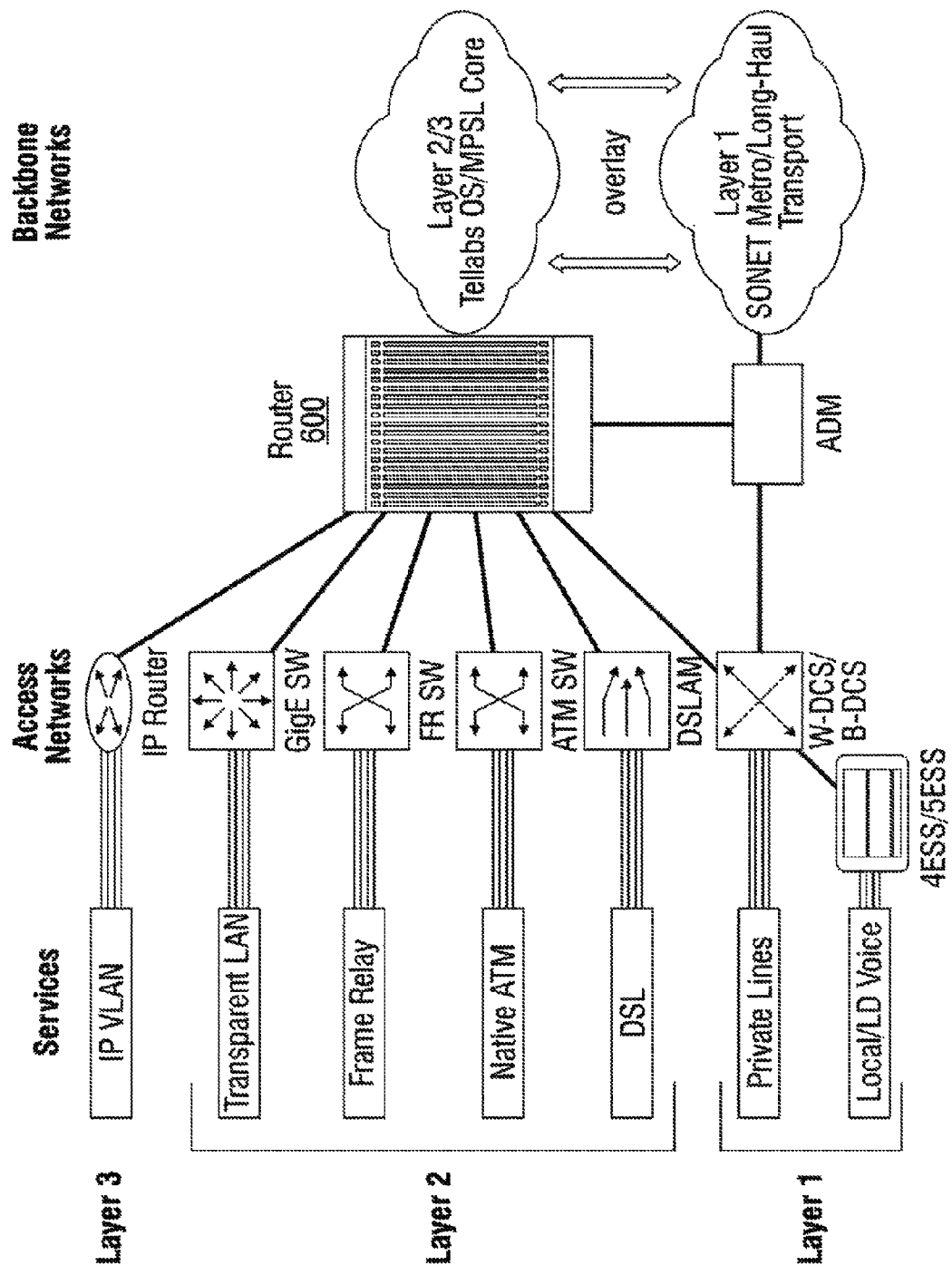
FIG. 6 is a block diagram of a multi-service internet protocol network with a multi-service routing platform.

FIG. 6 shows a router 600, which may be a Tellabs 8800 Multi-Service Router or any other suitable router, that aggregates the traffic from existing access equipment, such as Frame Relay switches, ATM switches, DSL Access Multiplexers (DSLAMs), IP routers, and Digital Cross-connect Systems (DCSs), onto an internet protocol (IP) network. The router 600 supports various network interfaces that accept multi-protocol incoming traffic. Arriving packets are encapsulated into multiprotocol label switched (MPLS) packets with a simple label stack that expedites the forwarding process in the core. At the receiving end, the MPLS packets are decapsulated back to the designated protocol and forwarded to the appropriate outgoing interface. This process applies to most existing network protocols and thus provides a neat solution for multi-service IP networks.

Multi-service routers provide many benefits to service providers, including, but not limited to: control plane reduction through a unified IP transport for multi-service networks and reduced network complexity; unlimited scalability thanks to a hierarchical label stack; complete QoS support, including the routing configuration processes described herein; simpler network management through pre-established Label Switching Paths (LSPs) service that make is easier to provision point-to-point connections for edge subscribers, manage the traffic in the core for load balancing, and perform a fast re-route under a link failure; and additional features, including Class 5 features, such as Caller ID and Call Waiting.

Figure 7A:
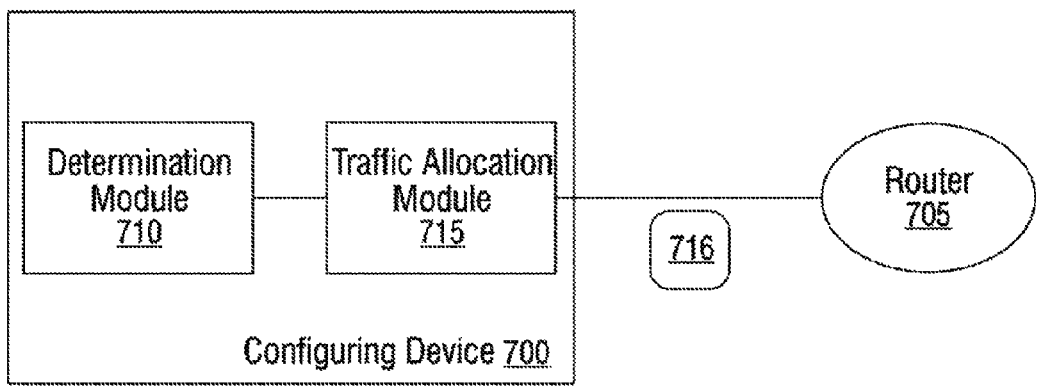
FIGS. 7A and 7B are block diagrams of example configuring devices, in accordance with embodiments of the present invention.

FIG. 7A shows an example configuring device (or calculator) 700 to configure traffic allocations for a router 705 (e.g., the router 600 of FIG. 6). The configuring device 700 has a determination module 710 and traffic allocation module 715.

The determination module 710 is communicatively coupled to the traffic allocation module 715. The traffic allocation module 715, in turn, is communicatively coupled to the router 705.

According to one embodiment, the determination module 710 is configured to determine a traffic weight value for each of a plurality of traffic rate values. Each traffic rate value is associated with a respective class of service. The traffic allocation module 715 sets traffic allocations for each class of service on the router 705 based on the determined traffic weight values.

According to another embodiment, the determination module 710 is configured to determine a traffic rate value for each of a plurality of traffic weight values. Each traffic weight value in such an embodiment is associated with a respective class of service. The traffic allocation module 715 sets traffic allocations for each class of service on the router 705 based on the determined traffic rate values.

In other embodiments (not shown), to perform (some or all of) the procedures 300 and 350, described in reference to FIGS. 3A and 3B, the configuring device (or calculator) 700 includes one or more of the following modules (or sub-modules); a packet dropping module, monitoring module, adjusting module, alarm module, inspection module, analysis module, and presentation module. These modules (or sub-modules) are communicatively coupled to the router 705, determination module 710, traffic allocation module 715, and/or to each other, accordingly.

Figure 7B:
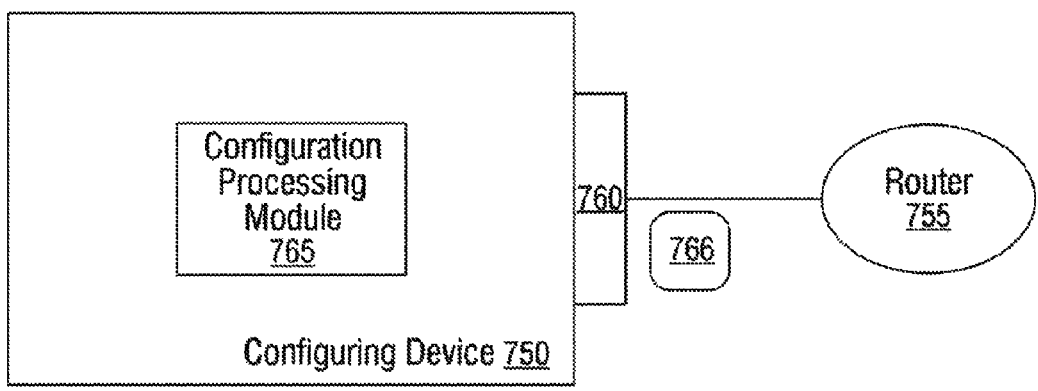

FIG. 7B shows another example configuring device (or calculator) 750 to configure traffic allocations for a router 755 (e.g., the router 600 of FIG. 6). The configuring device 750 has an interface 760 and configuration processing module 765. The router 755 and interface 760 are communicatively coupled. The interface 760, in turn, is communicatively coupled to the configuration processing module 765.

The configuration processing module 765 is configured to determine: i) a traffic weight value or ii) traffic rate value for each of a plurality of traffic rate values. Each traffic rate value is associated with a respective class of service. The configuration processing module 765 sets traffic allocations for each class of service on the router 755 based on the determined i) traffic weight values or ii) traffic rate values, through (or using) the interface 760.

In other embodiments (not shown), the configuration processing module 765 may be further configured to perform the procedures 300 and 350 described in reference to FIGS. 3A and 3B.

In reference to FIG. 7A (and to FIG. 7B), in one embodiment, the traffic allocations, which are determined based on traffic weight or traffic rate values, are set on the router 705 (755) by way of a message, signal, or other indication 716 (766).

In another embodiment (not shown), traffic rate or traffic weight values are sent to the configuring device 700 (750) (e.g., from the WFQ calculator of FIG. 1 or from a network management element) as a message, signal or other indication. Such a message, signal or indication may be received by the configuring device 700 (750) through an appropriate interface. In yet another embodiment (not shown), the traffic rate or traffic weight values are entered into the configuring device 700 (750) by a user who uses a graphical interface like the one shown in FIG. 1.

The configuring devices 700 and 750 may be a physical node in a network like the computers 50, 60 in the network 70 of FIG. 5 or other network devices, such as a switch, optical transport system, or the router 600 of FIG. 6. The devices 700 and 750 may be part of a physical network node as a component, module, blade or card of that node.

Alternatively, the configuring devices 700 and 750 may be a general purpose computer having a processor, memory, communication interface, etc. (described above in greater detail in reference to FIG. 5). The general purpose computer is transformed into the configuring devices 700 and 750 and their components, for example, by loading instructions into the processor that cause the computer to, for example, determine a traffic weight value (or traffic rate value) for each of a plurality of traffic rate values, in which each traffic rate value is associated with a respective class of service, and set traffic allocations for each class of service on a router based on the determined traffic weight values (or determined traffic rate values).

While this invention has been particularly shown and described with references to example embodiments thereof, it will be understood by those skilled in the art that various changes in form and details may be made therein without departing from the scope of the invention encompassed by the appended claims.

What is claimed is:

1. A method of configuring traffic allocations for a router, the method comprising:

determining a traffic weight value of a plurality of traffic weight values, for each of a plurality of traffic rate values, each traffic rate value indicating a percentage of interface bandwidth of the router allocated to a respective class of service, the traffic weight value indicating a share of a subset of the interface bandwidth;

setting traffic allocations for each class of service on the router based on the plurality of traffic weight values; and dropping one or more packets in a particular class of service at the router if a projected traffic rate associated with the particular class of service exceeds the traffic allocation for the particular class of service.

2. The method of claim 1, further including:

monitoring traffic rates at the router as a function of class of service; and automatically adjusting traffic allocations based on changes in actual traffic rates from projected traffic rates.

3. The method of claim 1, further including:

monitoring traffic rates at the router as a function of class of service; and emitting an alarm when actual traffic rates deviate from projected traffic rates.

4. The method of claim 3, further including:

transmitting the alarm to a device connected to the router; and changing traffic allocations at the device.

5. The method of claim 1, further including:

performing deep packet inspection on packets transmitted or received by the router;

generating trend analysis based on the deep packet inspection; and presenting results of the trend analysis to a user.

6. A method of configuring traffic allocations for a router, the method comprising:

determining a traffic rate value of a plurality of traffic rate values, for each of a plurality of traffic weight values indicating a share of a subset of interface bandwidth of the router, each traffic weight value associated with a respective class of service, each traffic rate value indicating a percentage of the interface bandwidth of the router allocated to a respective class of service;

setting traffic allocations for each class of service on the router based on the plurality of traffic rate values; and dropping one or more packets in a particular class of service at the router if a projected traffic rate associated with the particular class of service exceeds the traffic allocation for the particular class of service.

7. The method of claim 6, further including:

monitoring traffic rates at the router as a function of class of service; and automatically adjusting traffic allocations based on changes in actual traffic rates from projected traffic rates.

8. The method of claim 6, further including:

monitoring traffic rates at the router as a function of class of service; and emitting an alarm when actual traffic rates deviate from projected traffic rates.

9. The method of claim 8, further including:
transmitting the alarm to a device connected to the router; and
changing traffic allocations at the device.

10. The method of claim 6, further including:
performing deep packet inspection on packets transmitted or received by the router;
generating trend analysis based on the deep packet inspection; and
presenting results of the trend analysis to a user.

11. An apparatus to configure traffic allocations for a router, the apparatus includes a processor for executing instructions stored in a memory, the processor executing:
a determination module the determination module configured to determine a traffic weight value of a plurality of traffic weight values, for each of a plurality of traffic rate values, each traffic rate value indicating a percentage of interface bandwidth of the router allocated to a respective class of service, the traffic weight values indicating a share of a subset of the interface bandwidth; and
a traffic allocation module, communicatively coupled to the determination module, to set traffic allocations for each class of service on the router based on the plurality of traffic weight values.

12. The apparatus of claim 11, further comprising a packet dropping module, communicatively coupled to the traffic allocation module, to drop one or more packets in a particular class of service at the router if a projected traffic rate associated with the particular class of service exceeds the traffic allocation for the particular class of service.

13. The apparatus of claim 11, further comprising:
a monitoring module to monitor traffic rates at the router as a function of class of service; and
an adjusting module, communicatively coupled to the monitoring module, to adjust traffic allocations automatically based on changes in actual traffic rates from projected traffic rates.

14. The apparatus of claim 11, further comprising:
a monitoring module to monitor traffic rates at the router as a function of class of service; and
an alarm module, communicatively coupled to the monitoring module, to emit an alarm when actual traffic rates deviate from projected traffic rates.

15. The apparatus of claim 14, wherein the alarm module further transmits the alarm to a device connected to the router and changes traffic allocations at the device.

16. The apparatus of claim 11, further comprising:
an inspection module to perform deep packet inspection on packets transmitted or received by the router;
an analysis module, communicatively coupled to the inspection module, to generate trend analysis based on the deep packet inspection; and
a presentation module, communicatively coupled to the analysis module, to present results of the trend analysis to a user.

17. An apparatus to configure traffic allocations for a router, the apparatus includes a processor for executing instructions stored in a memory, the processor executing:
a determination module the determination module configured to determine a traffic rate value of a plurality of traffic rate values, for each of a plurality of traffic weight values indicating a share of a subset of interface bandwidth of the router, each traffic weight value associated with a respective class of service, each traffic rate value indicating a percentage of the interface bandwidth of the router allocated to a respective class of service; and
a traffic allocation module, communicatively coupled to the determination module, to set traffic allocations for each class of service on the router based on the plurality of traffic rate values.

18. The apparatus of claim 17, further comprising a packet dropping module, communicatively coupled to the traffic allocation module, to drop one or more packets in a particular class of service at the router if a projected traffic rate associated with the particular class of service exceeds the traffic allocation for the particular class of service.

19. The apparatus of claim 17, further comprising:
a monitoring module to monitor traffic rates at the router as a function of class of service; and
an adjusting module, communicatively coupled to the monitoring module, to adjust traffic allocations automatically based on changes in actual traffic rates from projected traffic rates.

20. The apparatus of claim 17, further comprising:
a monitoring module to monitor traffic rates at the router as a function of class of service; and
an alarm module, communicatively coupled to the monitoring module, to emit an alarm when actual traffic rates deviate from projected traffic rates.

21. The apparatus of claim 20, wherein the alarm module further transmits the alarm to a device connected to the router and changes traffic allocations at the device.

22. The apparatus of claim 17, further comprising:
an inspection module to perform deep packet inspection on packets transmitted or received by the router;
an analysis module, communicatively coupled to the inspection module, to generate trend analysis based on the deep packet inspection; and
a presentation module, communicatively coupled to the analysis module, to present results of the trend analysis to a user.

23. An apparatus to configure traffic allocations for a router, the apparatus includes a processor for executing instructions stored in a memory, the apparatus comprising:
an interface communicatively coupled to the router; and
a configuration processing module communicatively coupled to the interface, the configuration processing module implemented in the processor, the determination module configured to:
determine i) a traffic weight value of a plurality of traffic weight values, for each of a plurality of traffic rate values each traffic rate value indicating a percentage of interface bandwidth of the router allocated to a respective class of service, the traffic weight value indicating a share of a subset of the interface bandwidth; or
determine ii) a traffic rate value of a plurality of traffic rate values, for each of a plurality of traffic weight values indicating a share of a subset of interface bandwidth of the router, each traffic weight value associated with a respective class of service, each traffic rate value indicating a percentage of the interface bandwidth of the router allocated to a respective class of service;
and set traffic allocations for each class of service on the router based on i) the plurality of traffic weight values or ii) the plurality of traffic rate values, through the interface.

24. A computer program product including a non-transitory computer readable medium having a computer readable program, the computer readable program when executed by a computer, transforms the computer into a programmed computer and causes the programmed computer to:

determine i) a traffic weight value of a plurality of traffic weight values, for each of a plurality of traffic rate values each traffic rate value indicating a percentage of interface bandwidth of the router allocated to a respective class of service, the traffic weight value indicating a share of a subset of the interface bandwidth; or determine ii) a traffic rate value of a plurality of traffic rate values, for each of a plurality of traffic weight values indicating a share of a subset of interface bandwidth of the router, each traffic weight value associated with a respective class of service, each traffic rate value indicating a percentage of the interface bandwidth of the router allocated to a respective class of service;

and set traffic allocations for each class of service on the router based on i) the plurality of traffic weight values or ii) the plurality of traffic rate values, through the interface.

* * * * *